United States Patent [19]
Lee

[11] Patent Number: 5,394,553
[45] Date of Patent: Feb. 28, 1995

[54] HIGH PERFORMANCE ARRAY PROCESSOR WITH NONLINEAR SKEWING OF ELEMENTS

[75] Inventor: De-Lei Lee, Richmond Hill, Canada

[73] Assignee: Lee Research, Inc., Ontario, Canada

[21] Appl. No.: 713,863

[22] Filed: Jun. 12, 1991

[51] Int. Cl.$^6$ .............. G06F 7/64; G06F 9/22; G06F 9/46; G06F 13/378
[52] U.S. Cl. .................. 395/800; 364/229; 364/229.5; 364/230.5; 364/232.21; 364/232; 364/231.9; 364/240.2; 364/243.44; 364/254.4; 364/256.5; 364/DIG. 1; 364/DIG. 2
[58] Field of Search ............. 395/650, 800, 400, 425, 395/500, 200, 775, 725, 325, 250, 275, 375, 575, 11, 55, 550, 800, 650; 364/DIG. 1, DIG. 2; 340/825.85

[56] References Cited

U.S. PATENT DOCUMENTS

| | | | |
|---|---|---|---|
| 4,851,995 | 7/1989 | Hsu et al. | 395/550 |
| 4,992,934 | 2/1991 | Portanova et al. | 395/375 |
| 5,088,048 | 2/1972 | Dixon et al. | 395/55 |
| 5,111,389 | 5/1992 | McAuliffe et al. | 395/800 |
| 5,170,463 | 12/1992 | Fujimoto et al. | 395/11 |

OTHER PUBLICATIONS

M. Balakrishnan, R. Jain & C. S. Raghavendra, On Array Storage For Conflict-Free Memory Access For Parallel Processors.

Kenneth Batcher, The Multidimensional Access Memory in STARAN, IEEE Transactions on Computers, Feb. 1977, pp. 174–177.

P. Budnik and D. J. Kuck, The Organization and Use of Parallel Memories, IEEE Transactions on Computers, Dec. 1971, pp. 1566–1569 Dec. 1974.

Per-Erik Danielsson and Stefano Levialdi, Computer Architectures for Pictorial Information Systems, pp. 53–67.

K. Kim and V. K. Prasanna Kumar, Perfect Latin Squares and Parallel Array Access, pp. 372–379 May 1989.

D. J. Kuck & R. A. Stokes, The Burroughs Scientific Prodessor (BSP), IEEE Transactions on Computers, VO. C-31, No. 5, May 1982, pp. 363–376.

D. H. Lawrie, Access and Alignment of Data in an Array Processor IEEE Transactions on Computers, vol. C-24, No. 12, Dec. 1975, pp. 1145–1155.

De-Lei Lee, Scrambled Storage for Parallel Memory Systems, 1988 IEEE, pp. 232–239.

De-Lei Lee, On Access And Alignment of Data In A Parallel Processor, vol. 33, No. 1, 14 Oct. 1989 pp. 11–14.

De-Lei Lee, Design of an Array Processor for Image Processing, Journal of Parallel and Distributed Computing, 11, (Feb. 1991) pp. 163–169.

De-Lei Lee, Efficient Address Generation in a Parallel Processor, vol. 36, No. 3, Nov. 1, 1990.

Jong Won Park, An Efficient Memory System for Image Processing, IEEE Transactions on Computers, vol. C35, No. 7, Jul. 1986, pp. 669–674.

Marshall C. Pease, III, The Indirect Binary n-Cube Microprocessor Array, IEEE Transactions on Computers, May 1977, pp. 458–473.

Anthony P. Reeves, Parallel Computer Architectures for Image Processing, Computer Vision, Graphics, and Image Processing 25, 68–88 (1984) pp. 68–89.

(List continued on next page.)

*Primary Examiner*—Alyssa H. Bowler
*Assistant Examiner*—Daniel H. Pan
*Attorney, Agent, or Firm*—Staas & Halsey

[57] ABSTRACT

An array processor is described with N processing elements, N memory modules, and an interconnection network that allows parallel access and alignment of rows, columns, diagonals, contiguous blocks, and distributed blocks of N×N arrays. The memory system of the array processor uses the minimum number of memory modules to achieve conflict-free memory access, and computes N addresses with O($\log_2 N$) logic gates in O(1) time. Furthermore, the interconnection network is of multistage design with O($N\log_2 N$) logic gates, and is able to align any of these vectors of data for store/fetch as well as for subsequent processing with a single pass through the network.

7 Claims, 3 Drawing Sheets

OTHER PUBLICATIONS

Henry D. Shapiro, Theoretical Limitations on the Efficient Use of Parallel Memories, IEEE Transactions on Computers, vol. C–27, No. 5, May 1978, pp. 421–428.

David C. VanVoorhis & T. H. Morrin, Memory Systems for Image Processing, IEEE Transactions on Computers, vol. C–27, No. 2, Feb. 1978, pp. 113–125.

Shlomo Weiss, An Aperiodic Storage Scheme to Reduce Memory Conflicts in Vector Processors, pp. 380–386.

H. A. G. Wijshoff & J. Van Leeuwen, On Linear Skewing Schemes and d–Ordered Vectors, IEEE Transactions on Computers, vol. C–36, No. 2, Feb. 1987, pp. 233–239.

Chuan–Lin Wu & Tse–Yun Feng, On A Class of Multistage Interconnection Networks, 1980 IEEE, pp. 694–702.

M. Balakrishnan, R. Jain, C. S. Raghavendra, "On array storage for conflict–free access for parallel processors," *Proc. 17th International Conference on Parallel Processing*, pp. 103–107, Aug. 1988.

K. E. Batcher, "The multidimensional access memory in STARAN," *IEEE Trans. Comput.*, vol. C–26, pp. 174–177, Feb. 1977.

P. Budnik and D. J. Kuck, "The organization and use of parallel memories," *IEEE Trans. Comput.*, vol. C–20, pp. 1566–1569, Dec. 1971.

P. E. Danielsson and S. Levialdi, "Computer architectures for pictorial information systems," *Computer*, vol. 14, pp. 53–67, Nov. 1981.

K. Kim and V. K. Kumar, "Perfect Latin square and parallel array access," *Proc. 16th Annual International Symposium on Computer Architecture*, pp. 372–379, May 1989.

D. J. Kuck and R. A. Stokes, "The Burroughs scientific processor (BSP)," *IEEE Trans. Comput.*, vol. C–31, pp. 363, 376, May 1982.

D. Lawrie, "Access and alignment of data in an array processor," *IEEE Trans. Comput.*, vol. C–24, pp. 1145–1155, Dec. 1975.

D–L. Lee, "Scrambled storage for parallel memory systems," *Proc. 15th Annual International Symposium on Computer Architecture*, pp. 232–239, May 1988.

D–L. Lee, "On access and alignment of data in a parallel processor," *Information Processing Letters*, vol. 33, pp. 11–14, Oct. 1989.

D–L. Lee, "Design of an array processor for image processing," *Journal of Parallel and Distributed Computing*, 1990 (in press) (Feb.) pp. 163–169.

D–L. "Efficient address generation in a parallel processor," *Information Processing Letters*, (Nov. 1990) (in press) vol. 36, No. 3.

J. W. Park, "An efficient memory system for image processing," *IEEE Trans. Comput.*, vol. C–35, pp. 669–674, Jul. 1986.

M. C. Pease, "The indirect binary n–cube microprocessor array," *IEEE Trans. Comput.*, vol. C–26, pp. 458–473, May 1977.

A. P. Reeves, "Parallel computer architectures for image processing," *Computer vision, Graphics, and Image Processing*, vol. 25, pp. 68–88, Feb. 1984.

H. D. Shapiro, "Theoretical limiatations on the efficient use of parallel memories," *IEEE Trans. Comput.*, vol. C–27, pp. 421–428, May 1978.

D. C. Van Voorhis and T. H. Morrin, "Memory systems for image processing," *IEEE Trans. Comput.*, vol. C–27, pp. 113–125, Feb. 1978.

S. Weiss, "An aperiodic storage scheme to reduce memory conflicts in vector processor," *Proc. 16th Annual International Symposium on Computer Architecture*, pp. 380–386, May 1989.

H. A. G. Wijshoff and J. van Leeuwen, "On linear skewing schemes and d–ordered vectors," *IEEE Trans. Comput.*, vol. C–36, pp. 233–239, Feb. 1987.

C. Wu and T. Y. Feng, "On a class of multistage interconnection networks," *IEEE Trans. Comput.*, vol. C–29, pp. 694–702, Aug. 1980.

HIGH PERFORMANCE ARRAY PROCESSOR WITH NONLINEAR SKEWING OF ELEMENTS

FIELD OF THE INVENTION

This invention relates in general to parallel processing systems, and more particularly to an array processor for accessing and alignment of rows, columns, diagonals, contiguous blocks, and distributed blocks, etc., of an N×N matrix.

BRIEF DESCRIPTION OF THE DRAWINGS

A description of the prior art and a description of the present invention is provided in detail below with reference to the following drawings, in which.

BACKGROUND OF THE INVENTION

Considerable research has been devoted to developing skewing schemes and interconnection networks for array processors, which allow parallel, conflict-free access and alignment of various N-vectors (e.g. rows, columns, diagonals, etc.) frequently encountered in large numerical calculations. More particularly, the desirability of fetching contiguous blocks and distributed blocks is well known from various image processing and numerical applications.

Figure 1:
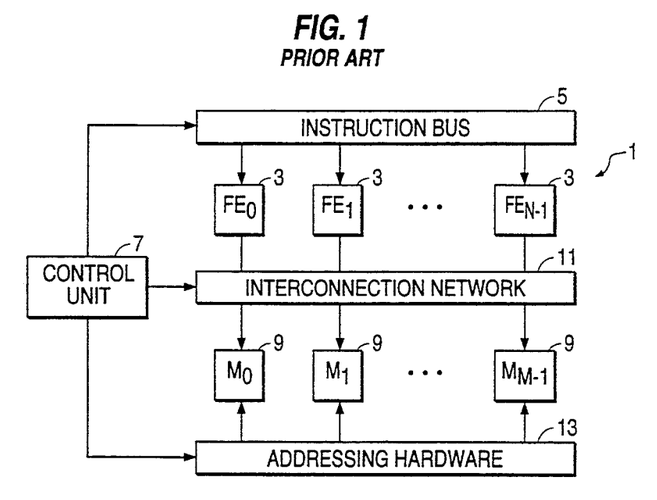
FIG. 1 is a block diagram of a prior art array processor.

Turning to FIG. 1, a typical array processor 1 is shown comprising a collection of N processing elements 3, where N is a power of 2, driven by a single instruction stream via a bus 5 under control of a control unit 7. The processing elements 3 (PE's) are connected to a collection of M memory modules 9 by an interconnection network 11. Addressing hardware 13 is provided for generating local address signals for accessing locations within the memory modules 9.

There are two important aspects in such a parallel processing system, which plays a crucial role in achieving its full potential performance. Firstly, the memory system must insure that access to any N-vector of interest occurs without memory conflicts and local addresses of the elements of the N-vector must be generated by the addressing hardware 13 simultaneously for all of the memory modules 9. Secondly, the interconnection network 11 must insure that the elements of the N-vector are aligned with the correct processing elements for processing or with the memory modules 9 for storage.

In such systems, the maximum size of vectors that can be effectively used is N. M>N the chances of a memory conflict are low and the processing elements 3 receive high utilization. On the other hand, the complexity of the interconnection network 11 increases with increasing M and the memory utilization decreases. When M=N both the processing elements 3 and memory modules 9 receive high utilization, and utilization efficiency of the interconnection network 11 is maximized.

It is an object of the present invention to provide parallel, conflict-free access and alignment of the N-vectors in U in an array processor with N=M, where U={rows, columns, diagonals, contiguous blocks, distributed blocks} of an N×N matrix.

With the restriction of using the minimum number of memories M=N, several important results on array processors are known. Budnik and Kuck have proven that it is impossible to use a linear skewing scheme and M=N memory modules to provide conflict-free access to rows, columns, and diagonals of the matrix (P. Budnik and D. J. Kuck, "The organization and use of parallel memories," IEEE Trans Comput. vol. C-20, pp. 1566–1569, December 1971). A skewing scheme is a function that maps the elements of the N×N matrix to M memories. A skewing scheme F is called linear if there exist constants "a" and "b" such that $F(i,j) = a \times i + b \times j$ modulo M. As a result, Lawrie has proposed an array processor that allows parallel, conflict-free access and alignment of rows, columns, diagonals, and square blocks of the matrix, using a linear skewing scheme at the expense of using M=2N memory modules (D. Lawrie, "Access and alignment of data in an array processor," IEEE Trans. Comput., vol. C-24, pp. 1145–1155, December 1975).

Batcher has developed an array processor with M=N, based on a nonlinear skewing scheme (K. E. Batcher, "The multidimensional access memory in STARAN," IEEE Trans. Comput. vol, C-26, pp.174–177, February 1977). Batcher's processor allows parallel, conflict-free access and alignment of only the row and column N-vectors in U.

In light of the impossibility result of Budnick and Kuck on linear skewing schemes, the notion of nonlinear skewing schemes has been further developed recently by a number of researchers. The studies in M. Balakrishnan, R. Jain and C. S. Raghavendra, "On array storage for conflict-free access and for parallel processors," Proc. 17th International Conference on Parallel Processing, pp.103–107, August 1988; K. Kim and V. K. Kumar, "Perfect Latin square and parallel array access," Proc. 16th Annual International Symposium on Computer Architecture, pp.372–379, May 1989; deal with the design of memory systems for matrix storage, describing nonlinear skewing schemes for mapping data into N memory modules to permit conflict-free access to rows, columns, diagonals, and blocks of the matrix.

Other research has addressed not only the design of memory systems but also the construction of interconnection networks for data alignment, thereby providing complete solutions to the overall system design problem for array processors. More specifically, the inventor has shown how to construct an array processor with N=M, based on a nonlinear skewing scheme to allow parallel, conflict free access and alignment of row, column and square block N-vectors in U (D. -L. Lee, "Scrambled storage for parallel memory systems," Proc. 15th Annual International Symposium on Computer Architecture, pp. 232–239, May 1988 and D. -L. Lee, "Design of an array processor for image processing," Journal of Parallel and Distributed Computing, Vol. 11, pp. 163-169, February 1991). And, in D. -L Lee, "Efficient address generation in a parallel processor," Information Processing Letters, Vol. 36, pp. 111-116, November 1990, and D. -L. Lee, "On Access and Alignment of Data in a Parallel Processor," Information Processing Letters, Vol. 33, pp. 11-14, October 1989, the inventor shows how to construct an array processor with N=M, based on a nonlinear skewing scheme to allow, parallel, conflict-free access and alignment of the row, column, and diagonal N-vectors in U.

SUMMARY OF THE INVENTION

According to the present invention, a solution is provided to the problem of parallel, conflict-free access and alignment of the N-vectors in U in an array processor with N=M, where U={rows, columns, diagonals, contiguous blocks, distributed blocks}]of an N×N matrix, where N is an even power of 2.

According to the preferred embodiment, a high-performance array processor is provided with the advantage of being both simple and efficient in two important aspects. Firstly, it uses the minimum number of memory modules 9 to avoid memory conflicts, and the memory system is able to generate simultaneously all N local addresses from $O(\log_2 N)$ logic gates in constant time (henceforth in this specification the notation $O(\log N)$ shall be used to denote $O(\log_2 N)$). Secondly, the interconnection network 11 is able to align any of these N-vectors for processing or storage with a single pass through the network.

Therefore, in accordance with an aspect of the invention there is provided an array processor having N processing elements, N memory modules and an interconnection network for effecting parallel access and alignment of rows, columns, diagonals, contiguous blocks and distributed blocks of an N×N array denoted as A, wherein for an integer i, where $0 \leq i < N$, $i_m$ denotes bit m in the binary representation of said integer, and wherein $i_{j:m} i_{p:q}$ denotes a further integer derived by concatenating $i_{p:q}$ at the right of $i_{j:m}$ in the array A, the improvement comprising a nonlinear skewing scheme for mapping each element A [i,j] of an N-vector in $\Gamma_G^l \cup \Delta_G^l$ to a distinct one of said memory modules denoted as F(i,j), for avoiding memory conflicts, wherein $F(i,j) = \omega(i) \oplus j$ for $0 \leq i, j < N$, and $\omega(i_{n-1:h} i_{h-1:0}) = i_{h-1:0} (i_{n-1:h} \oplus i_{h-1:0})$, and wherein h=n/2.

DETAILED DESCRIPTION OF THE PREFERRED EMBODIMENT

Figure 2A:
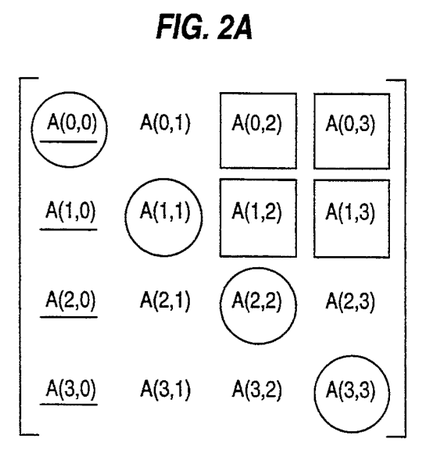
FIGS. 2A and 2B illustrate a standard arrangement of matrix elements of a matrix A, and vectors of interest in accordance with the prior art.
Figure 2B:
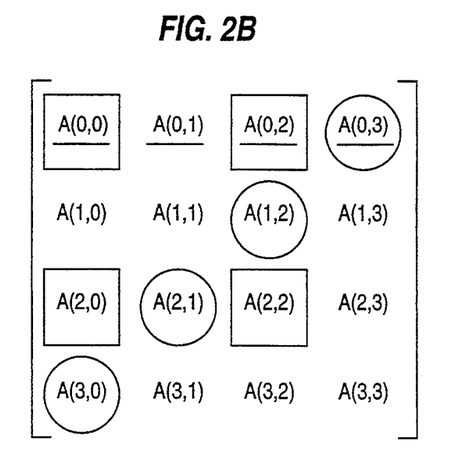

Throughout this specification, N will denote any even power of two, and $N=2^n$. Given an N×N matrix A, the standard arrangement of matrix space is shown illustrated in FIG. 2. In FIG. 2A, the first column is underlined, the second contiguous block is in squares, and the forward diagonal is circled. In FIG. 2B, the first row is underlined, the first distributed block is in squares, and the backward diagonal is circled.

The order of any subset of elements in matrix space is defined as that arrangement derived by concatenating the i+1th row at the right of the ith row for all i and then selecting the desired subset. Any N elements from matrix space are defined as an N-vector, and the elements of an N-vector are indexed 0 to N−1 according to their ordering in matrix space.

In addition to one-dimensional row and column vectors, the present invention relates to an addressing of any other N-vector of matrix space, for example such as forward diagonal $\{A[k,k] | 0 \leq k < N\}$ and backward diagonal $\{A[k, N-k-19 | 0 \leq k < N\}$ vectors. For clarity of description, it will be convenient in the present specification to refer to the binary representation of integer numbers. For an integer i, let $i_m$ denote bit m in the binary representation of integer $0 \leq i < N$ $$i = i_{n-1} \times 2^{n-1} + i_{n-2} \times 2^{n-2} + \ldots + i_0 \times 2^0$$

The notation $i_{j:m}$ where j>m, shall denote the integer with binary representation of j−m+1 bits $i_j \ldots i_m$. The notation $i_{j:m} i_{p:q}$ shall denote the integer derived by concatenating $i_{p:q}$ at the right of $i_{j:m}$, i.e., $i_j \ldots i_m i_p \ldots i_q$.

While rows, columns, and diagonals are commonly considered as one-dimensional data, contiguous blocks and distributed blocks are two-dimensional data. Thus, the matrix of A may be partitioned into N disjoint square blocks with each consisting of adjacent matrix elements within a $\sqrt{N} \times \sqrt{N}$ rectangular region in matrix space. For the purpose of this specification, these square blocks will be referred to as contiguous blocks, and the ith contiguous block will be defined as $\{A[i_{n-1:h} k_{n-1:h}, i_{h-1:0} k_{h-1:0}] | 0 \leq k < N\}$, where $0 \leq i < N$. In contrast to contiguous blocks, a distributed block consists of N matrix elements that are evenly distributed in matrix space in both dimensions. In other words, a distributed block contains matrix elements found on intervals of $\sqrt{N}$ units in both coordinates. Formally, the ith distributed block is defined in the present specification as $\{A[k_{n-1:h} i_{n-1:h}, k_{h-1:0} i_{h-1:0}] | 0 \leq k < N\}$, where $0 \leq i < N$. Thus, given a two-dimensional grid with N points, (as will be described in greater detail blow, the N processing elements can be interconnected through the network 11 as such a grid), the kth element of a contiguous/distributed block N-vector is at row $k_{n-1:h}$ and column $k_{h-1:0}$ of the grid. In the case of a contiguous block, neighbours on this grid are also neighbours in matrix space. In the case of a distributed block, neighbours on this grid are $\sqrt{N}$ units apart in matrix space.

We will refer in the present specification to a skewing scheme for A as a function $F: \{0, \ldots, N-1\} \times \{0, \ldots, N-1\} \to \{0, \ldots, N-1\}$, where $F(i,j) = k$ means that matrix element A[i,j] is stored in a predetermined one of the memory modules 9, denoted as memory module k. A skewing scheme for A is valid for U if and only if the skewing scheme maps the elements of any of the N-vectors in this collection to distinct memory modules 9 to avoid memory conflicts.

Turning now to the nonlinear skewing scheme for A according to the present invention, let $\bar{a}$ denote the bitwise complement of a, and $\oplus b$ denote the bitwise exclusive-or of a and b, where $0 \leq a, b < N$.

Definition. $\omega(i_{n-1:h} i_{h-1:0}) = i_{h-1:0} (i_{n-1:h} \oplus i_{h-1:0})$.

The function $\omega(i)$ simply concatenates the bitwise exclusive-or of the most significant h bits and the least significant h bits of i at the right of the least significant h bits of i.

Definition. $F(i,j) = \omega(i) \oplus j$ for $0 \leq i, j < N$.

The following lemma regarding certain properties of function F(i,j) is useful in establishing the validity of the skewing scheme for U.

Lemma 1. For any fixed integer $0 \leq i < N$, if $u \neq v$ then
1) $F(i,u) \neq F(i,v)$;
2) $F(u,i) \neq F(v,i)$;
3) $F(u,\underline{u}) \neq F(v,v)$;
4) $F(u,\bar{u}) \neq F(v,v)$;
5) $F(i_{n-1:h} u_{n-1:h}, i_{h-1:0} u_{h-1:0}) \neq F(i_{n-1:h} v_{n-1:h}, i_{h-1:0} v_{h-1:0})$;

6) $F(u_{n-1:h}i_{n-1:h},u_{h-1:0}i_{h-1:0}) \neq F(v_{n-1:h}i_{n-1:h},v_{h-1:0}i_{h-1:0})$;

Proof. This lemma can be proved by contradiction. Consider the first statement. Assume $F(i,u)=F(i,v)$. It follows that $\omega(i) \oplus u = \omega(i) \oplus v$. Eliminate the $\omega(i)$ terms, then $u=v$, a contradiction. By a completely analogous argument validity of the remaining statements can be proven.

Hence we get the following result.

Theorem 1. The proposed skewing scheme on A is valid for U.

Proof. The ith row consists of the set of matrix elements $\{A[i,k] | 0 \leq k < N\}$ where $0 \leq i < N$. For any given two elements $A[i,u]$ and $A[i,v]$, they will be stored in memory module $F(i,u)$ and memory module $F(i,v)$ according to the skewing scheme. If $A[i,u]$ and $A[i,v]$ are two different elements of the row, then $u \neq v$. It follows that $F(i,u) \neq F(i,v)$ due to lemma 1. Consequently, the elements of the ith row lie in distinct memory modules. By a similar argument using statements 2 to 6 of the above lemma for column, forward diagonal, backward diagonal, contiguous block and distributed block, respectively, the rest of the theorem can easily be proven.

Theorem 1 states that using the proposed nonlinear skewing scheme of the present invention, a memory system can be constructed with N memory modules to provide conflict-free access to any N-vector in U. This skewing scheme is efficient and has the advantage of permitting not only the memory system to use very simple addressing hardware 13 for parallel generation of local addresses, but also permits the array processor 1 to use a simple interconnection network 11 for necessary data alignment, as will be discussed in greater detail below.

When the matrix A is stored in the memory system, the elements of any N-vector in U lie in distinct memory modules 9. It then becomes necessary for the addressing hardware 13 to compute from which memory locations within the memory modules 9 to access the elements of the N-vector. Therefore, in accordance with the present invention there is provided the following addressing rule, which determines the local address within the memory module 9 where a given matrix element of the matrix is stored.

Addressing Rule: Store $A[i,j]$ in location j of memory module $F(i,j)$.

Together with the proposed skewing scheme, the above addressing rule further guarantees that all elements stored within a memory module 9 lie in distinct memory locations. This follows from the fact that no two elements of the same column are stored in the same memory module. Given any N-vector in U, the addressing hardware 13 of the memory system needs to calculate all N local addresses for the elements of the N-vector simultaneously for all memory modules. It is sufficient to provide each memory module $O(\log N)$ logic gates to calculate the local address for one element of the N-vector in each memory module. This results in a total of $O(N \log N)$ logic gates for parallel generation of local addresses.

As an important advantage of the present invention, the above-described skewing scheme greatly simplifies local address calculation for the memory system. Specifically, it can be shown how the skewing scheme of the present invention results in the ability to simultaneously calculate N local addresses for the elements of any N-vector in U in constant time from $O(\log N)$ logic gates. In the explanation which follows, let $\overline{\omega}$ be the inverse of $\omega$, and ab be the bitwise AND of a and b.

Definition. Define $\Gamma_G{}^l = \{A[\omega^{-1}(l \oplus \overline{G}k), l \oplus Gk] | 0 \leq k < N\}$, where $0 \leq G, l < N$.

Lemma 2. For any given $0 \leq G < N-1$, a) $|\Gamma_G{}^l| = N$ for any $0 \leq l < N$;

c) $\bigcup_{l=0}^{N-1} \Gamma_G{}^l = \{A[i,j] | 0 \leq i,j < N\}$.

Proof. The lemma is an immediate consequence of the above definition.

Lemma 2 states that for any fixed integer of $G, \Gamma_G{}^l$ defines a partition of A into V-vectors, and there are N different ways to partition A into N-vectors. More particularly, $\Gamma_G{}^l$ defines a partition of A into rows, columns, or distributed blocks depending upon the value of G. It can be verified that for any given l, $\Gamma_G{}^l$ defines a row, a column, or a distributed block of A as follows:

$\{A[i,k] | 0 \leq k < N\}$ if $G=N-1$, where $i=\omega^{-1}(l)$;

$\{A[k,i] | 0 \leq k < N\}$ if $G=0$, where $i=l$;

$\{A[k_{n-1:h}i_{n-1:h},k_{h-1:0}i_{h-1:0}] | 0 \leq k < N\}$ if $G=\sqrt{N} \times (\sqrt{N}-1)$, where $i=l$.

Lemma 3. In order to access a row, a column, or a distributed block of A, it is sufficient for memory module k to address its memory location $l \oplus Gk$ for all $0 \leq k < N$.

Proof. According to the addressing rule discussed above, element $A[\omega^{-1}(l \oplus Gk), l \oplus Gk]$ is stored in location $l \oplus Gk$ of memory module k. Thus, in order to access all elements in $\Gamma_G{}^l$, memory module k needs to address its memory location $l \oplus Gk$ for all $0 \leq k < N$. As $\Gamma_G{}^l$ consists of the elements of a row, a column, or a distributed block of A depending upon the value of G, the lemma follows.

Definition. Define $\Delta_G{}^l = \{A[\omega^{-1}(l \oplus G\omega(k)\omega k), l \oplus G\omega(k)] | 0 \leq k < N\}$, where $0 \leq G, l < N$.

The above definition leads directly to the following lemma.

Lemma 4. For any given $0 \leq G < n-1$, a) $|\Delta_G{}^l| = N$ for any $0 \leq l < N$, c) $\bigcup_{l=0}^{N-1} \Delta_G{}^l = \{A[i,j] | 0 \leq i,j < N\}$.

Proof. Lemma 4 follows directly from the above definition.

Lemma 4 states that for any fixed integer G, $\Delta_G{}^l$ defines a partition of A into N-vectors, and there are N different ways of partitioning A into N-vectors. It can be verified that for any given l, $\Delta_G{}^l$ defines the forward diagonal, the backward diagonal, or a contiguous block of A depending upon the value of G as follows:

$\{A[k,k] | 0 \leq k < N\}$ if $G=N-1$ and $l=0$;

$\{A[k,k] | 0 \leq k < N\}$ if $G=N-1$ and $l=\sqrt{N}=1$ $\{A[i_{n-1:h}k_{n-1:h},i_{h-1:0}k_{h-1:0}] | 0 \leq k < N\}$ if $G=\sqrt{N}-1$ and $i=\omega^{-1}(l)$, where $0 \leq l < N$.

Lemma 5. In order to access a forward diagonal, backward diagonal, or a contiguous block of A, it is sufficient for memory module k to address its memory location $l \oplus G\omega(k)$ for all $0 \leq k < N$.

Proof. The proof of lemma 5 is similar to that of lemma 3.

Lemmas 3 and 5 show that in order to calculate simultaneously the N local addresses for the elements of any N-vector in U, it is sufficient to compute either $l \oplus Gk$ or $l \oplus G\omega(k)$ for each memory module k in parallel when G and l are given.

Figure 3:
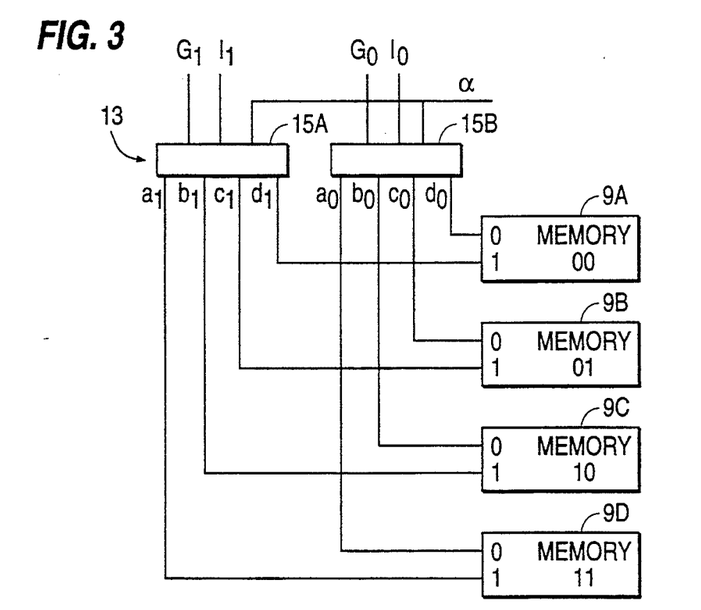
FIG. 3 illustrates an address bus structure in accordance with a preferred embodiment of the present invention.

An address bus structure will now be described in accordance with the present invention for parallel generation of local addresses for the memory system in order access any of the N-vectors defined by $\Gamma_G{}^l$ and $\Delta_G{}^l$.

The address bus structure of the present invention has 4n address lines, where $n = \log N$. The address lines are labelled $a_{n-1}, b_{n-1}, c_{n-1}, d_{n-1}, \ldots, a_0, b_0, c_0, d_0$. Given G,l, and $\alpha$, address lines, $a_i, b_i, c_i$, and $d_i$ are driven by $l_i \oplus G_i, (l_i \oplus G_i)\bar{\alpha} + l_i\alpha, (l_i \oplus G_i)\alpha + l_i\bar{\alpha}$, and $l_i$, respectively, for all $0 \leq i < n$, where + stands for the logical OR operation and $\alpha$ is a binary control variable.

There are n address pins of each memory module 9, and the ith address pin assumes the ith significant bit position of the n-bit address. The n address pins of each memory module 9 are connected to the address lines of the address bus structure as follows. For all $h \leq i < n$, address pins i and i−h of memory module k are connected to address lines $d_i$ and $d_{i-h}$ if $k_i = 0$ and $k_{i-h} = 0$; to address lines $c_i$ and $a_{i-h}$ if $k_i = 0$ and $k_{i-h} = 1$; to address lines $b_i$ and $c_{i-h}$ if $k_i = 1$ and $k_{i-h} = 0$; to address lines $a_i$ and $b_{i-h}$ if $k_i = 1$ and $k_{i-h} = 1$. Each of address lines $a_i, b_i, c_i$, and $d_i$ feeds a quarter of the memory modules.

FIG. 3 illustrates this address bus structure for the case of N=4.

The addressing hardware 13 is shown comprising blocks 15A and 15B receiving control inputs $G_1 l_1$, $G_0 l_0$ and $\alpha$ from control unit 7 (FIG. 1) for parallel addressing predetermined ones of memory modules 9A–9D via address lines $a_i$–$d_i$ and $a_0$–$d_0$.

The following two lemmas show that the addressing hardware 13 discussed above is able to generate local addresses for the memory system as desired.

Lemma 6. The addressing hardware 13 generates the memory address $l \oplus Gk$ for memory module k for all $0 \leq k < N$ in parallel.

Proof. Let $\alpha = 0$. Then, the address lines $a_i, b_i, c_i$, and $d_i$ of the address bus structure are driven by $l_i \oplus G_i$, $l \oplus G_i, l_i, l_i$, respectively, for all $0 \leq i < n$. Hence, the address pins i and i−h of memory module k for all $0 \leq k < N$ are driven by $l_i$ and $l_{i-h}$ if $k_i = 0$ and $k_{i-h} = 0$; by $l_i$ and $l_{i-h} \oplus G_{i-h}$ if $k_i = 0$ and $k_{i-h} = 1$; by $l_i \oplus G_i$ and $l_{i-h}$ if $k_i = 1$ and $k_{i-h} = 0$; or by $l_i \oplus G_i$ and $l_{i-h} \oplus G_{i-h}$ if $k_i = 1$ and $k_{i-h} = 1$. This means that the address pin $0 \leq i < n$ of memory module k is driven by $l_i \oplus G_i k_i$, which is equal to $l_i$ if $k_i = 0$, and $l_i \oplus G_i$ if $k_i = 1$. Thus, the addressing hardware generates the address $l \oplus Gk$ for memory module k for all $0 \leq k < N$ in parallel.

Lemma 7. The addressing hardware generates the memory address $l \oplus G\omega(k)$ for memory module k for all $0 \leq k < N$ in parallel.

Proof. Let $\alpha = 1$. Then, the address lines $a_i, b_i, c_i$, and $d_i$ are driven by $l_i \oplus G_i, l_i, l_i \oplus G_i$, and $l_i$, respectively, for all $0 \leq i < n$. Hence, the address pins i and i−h of memory module k for all $0 \leq k < N$ are driven by $l_i$ and $l_{i-h}$ if $k_i = 0$ and $k_{i-h} = 0$; by $l_i \oplus G_i$ and $G_{i-h} \oplus l_{i-h}$ if $k_i = 0$ and $k_{i-h} = 1$; by $l_i$ and $l_{i-h} \oplus G_{i-h}$ if $k_i = 1$ and $k_i = 1$ and $k_{i-h} = 0$ or by $l_i \oplus G_i$ and $l_{i-h}$ if $k_{i=1}$ and $k_{i-h} = 1$. This means that the address pin $h \leq i < n$ of memory module k is driven by $l_i \oplus Gk_{i-h}$, which is equal to $l_i$ if $k_{i-h} = 0$, and $l_i \oplus G_i$ if $k_{i-h} = 1$, and that the address pin $0 \leq i < h$ of the same memory module is driven by $l_i \oplus G_i(k_i \oplus k_{i+h})$, which is equal to $l_i$ if $k_i \oplus k_{i+h} = 0$, and $l_i \oplus G_i$ if $k_i \oplus k_{i+} = 1$. Therefore, the addressing hardware 13 as defined above generates the address $l \oplus G\omega(k)$ for memory module k for all $0 \leq k < N$ in parallel.

Given $l_i$, $G_i$ and $\alpha$, a constant number of logic gages and consequently a constant number of gate delays are required to compute $l_i \oplus G_i$, $(l_i \oplus G_i)\bar{\alpha} + l_i\alpha$, $(l_i \oplus G_i)\alpha + l_i\bar{\alpha}$ and $l_i$. This fact leads to the following theorem.

THEOREM 2. Given any N-vector in U, the N local addresses for the elements of the vector can be generated simultaneously in constant time with O(log N) logic gates.

Up to this point the invention has been described in terms of providing a solution to the memory aspect of the problem, namely mapping matrix elements to memory modules to insure conflict-free access and parallel calculation of local addresses for the elements of any N-vector in U. A solution will now be described regarding the network aspect of the problem, aligning the elements of any N-vector in U with correct processing elements for processing or memory modules for storage.

As described above, the skewing scheme of the present invention requires A[i,j] be stored in memory module F(i,j). Thus, in order to store an N-vector into memory, the elements of the vector must be aligned so that each element is placed in its corresponding memory module 9 determined by the skewing scheme. On the other hand, given any two N-vectors, in order to allow the operations between corresponding pairs of elements the two vectors must be aligned so that the kth elements are placed in the same processing element. After the operation is performed, the resulting N-vector may have to be aligned in order to store the result appropriately.

To simplify matters in this specification, it shall be assumed that the kth element of any N-vector will always be placed in the kth processing element following fetch or prior to storage for all $0 \leq k < N$. This allows operations between any pair of N-vectors in U by changing the ordering of both vectors to a common third ordering. The following definitions are useful.

Definition Let $\pi$ be a permutation of the set of integers $\{0, \ldots, N-1\}$. If a network 11 can produce $\pi$ by connecting its network input x to network output $y = \pi(x)$ for all integers in the range $0 \leq x < N$ then it can be said that the network passes $\pi$.

It is implicit in the above definition that a network passes a permutation if the permutation can be produced by a single unit transfer. By a unit transfer it is meant a single pass through the interconnection network 11.

Definition For any fixed integer $0 \leq i < N$, the following permutations are defined:

1) $\sigma_i(x) = F(i,x)$;
2) $\rho_i(x) = F(x,i)$;
3) $\delta(x) = F(x,x)$;
4) $\lambda(x) = F(x,x)$;
5) $Y_i(x) = F(i_{n-1:h}x_{n-1:h}, i_{h-1:0}x_{h-1:0})$;
6) $\mu_i(x) = F(x_{n-1:h}i_{n-1:h}, x_{h-1:0}i_{h-1:0})$.

As will be seen shortly, in order to store any N-vector in U into memory according to the skewing scheme of the present invention, the interconnection network 11 must be capable of passing the permutations defined.

Further, the interconnection network 11 must be also able to pass the inverses of these permutations in order to place the xth element of any N-vector in U in the xth processing element following a fetch operation.

In accordance with the present skewing scheme, when storing the ith row, where $0 \leq i < N$, into memory, the matrix element A[i,x] must be stored in memory module F(i,x). Knowing that A[i,x], the xth element of the row vector, is in the xth processing element prior to storage, the requirement for alignment of this vector thus far is that processing element x must be able to be connected to memory module F(i,x), namely, the network 11 must be able to pass $\sigma_i$. Conversely, fetching the ith row from memory requires that memory module F(i,x) be connected to processing element x in order to place the xth element of the row vector in the xth processing element. In other words, the network 11 must be able to pass the inverse of $\sigma_i$, i.e., $\sigma_i^{-1}$. A similar analysis reveals that the network 11 must also be capable of passing $\rho_i$ and $\rho_i^{-1}$ in order to store and fetch the ith column, where $0 \leq i < N$; passing $\delta$ and $\delta^{-1}$ in order to store and fetch the forward diagonal; passing $\lambda$ and $\lambda^{-1}$ in order to store and fetch the backward diagonal; passing $\tau_i$ and $\tau_i^{-1}$ in order to store and fetch the ith contiguous block; and passing $\mu_i$ and $\mu_i^{-1}$ in order to store and fetch the ith distributed block, where $0 \leq i < N$.

An interconnection network 11 will now be described which is capable of passing the various types of permutations identified above. In presenting such an interconnection network 11, it is useful to begin by using Pease's indirect binary n-cube network, (M. C. Pease, "the indirect binary n-cube microprocessor array," IEEE Trans. Comput, vol. C-26, pp. 458–473, May 1977), in place of the interconnection network in FIG. 1. The indirect binary n-cube network has N network inputs connected to N network outputs through n stages of switching nodes 17, and is shown for N=8 in FIG. 4.

The following theorem regarding the indirect binary n-cube network's capability in passing permutations is due to Pease.

Pease's Theorem Let $x = x_{n-1} \ldots x_0$ and $y = y_{n-1} \ldots y_0$. The indirect binary n-cube network can pass $\pi$ if and only if the function defining this permutation $y = \pi(x)$ can be written as a set of functions in the form:

$$y_k = x_k \oplus f_k(y_o, \ldots, y_{k-1}, x_{k+1}, \ldots, x_{n-1}) \quad (1)$$

for $0 \leq k < n$.

Figure 4:
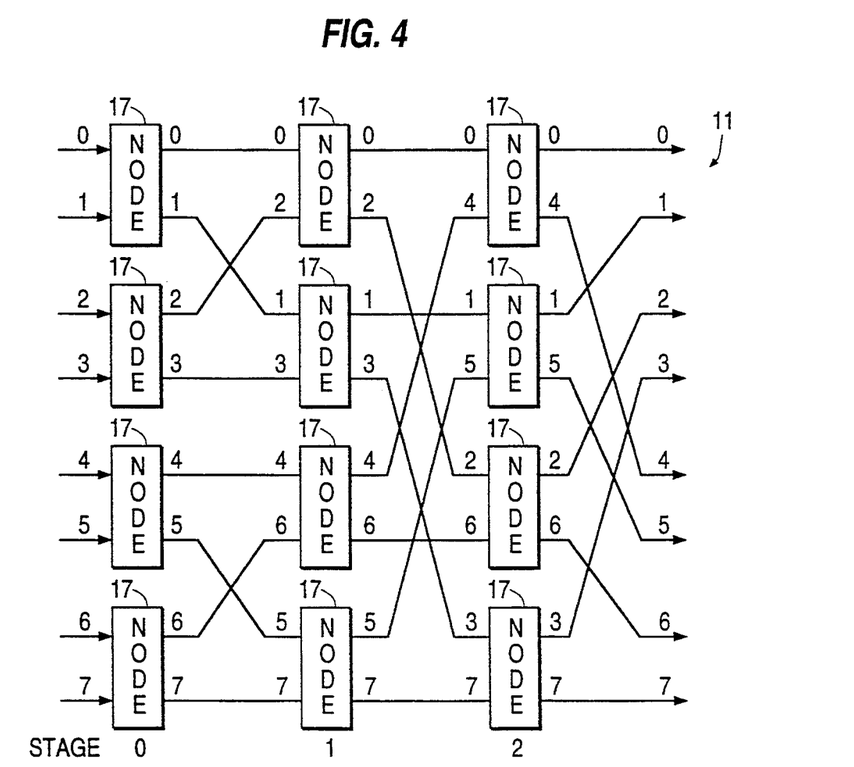
FIG. 4 illustrates an indirect binary n-cube network having N network inputs connected to N network outputs through n stages of switching nodes (where $n = \log_2 N$ in accordance with present invention.

Lemma 8. The indirect binary n-cube network passes the following permutations
 a) $\sigma_i$ and $\sigma^{-1}$;
 b) $\rho_i$;
 c) $\delta^{-1}$;
 d) $\lambda^{-1}$;
 e) $\tau_i$ and $\tau_i^{-1}$.

Proof. To show that the network passes $\sigma_i$, let $y = \sigma_i(x) = F(i,x)$. It follows that $y_k = x_k \oplus i_k \oplus i_{k+h}$ for $0 \leq k < h$, and $y_k = x_k \oplus i_{k-l}$ for $h \leq k < n$. Thus, the functions defining $\sigma_i$ are in the form of (1). The network passes $\sigma_i^{-1}$ due to that $\sigma_i = \sigma_i^{-1}$.

To show that the network passes $\rho_i$, let $y = \rho(x) = F(x,i)$. It follows that $y_k = x_k \oplus x_{k+h} \oplus i_k$ for $0 \leq k < h$, and $y_k = x_k \oplus y_{k-h} \oplus i_k \oplus i_{k-h}$ for $h \leq k < n$. Thus, the functions defining $\rho_i$ are in the form of (1).

It can be shown that $\delta^{-1}(x) = \omega(x)$. To show that the network passes $\delta^{-1}$, let $y = \delta^{-1}(x) = \omega(x)$. It follows that $y_k = x_k \oplus x_{k+h}$ for $0 \leq k < h$, and $y_k = x_k \oplus y_{k-h}$ for $h \leq k < n$. Thus, the functions defining $\delta^{-1}$ are in the form of (1).

It can be shown that $\lambda^{-1}(x) = \omega(x)$. To show that the network passes $\lambda^{-1}$, let $y = \lambda^{-1}(x) = \omega(x)$. It follows that $y_k = x_k \oplus x_{k+h}$ for $0 \leq k < h$, and $y_k = x_k \oplus y_{k-h}$ for $0 \leq k < n$. Thus, the functions defining $\lambda^{-1}$ are in the form of (1).

To show that the network passes $\tau_i$, let $y = \tau_i(x) = F(i_{n-1:h}x_{n-1:h}, i_{h-1:0}x_{h-1:0})$. It follows that $y_k = x_k \oplus x_{k+h} \oplus i_{k+h}$ for $0 \leq k < h$, and $y_k + x_k \oplus i_{k-h}$ for $h \leq k < n$. Thus, the functions defining $\tau_i$ are in the form of (1).

The proof that the network passes $\tau_i^{-1}$ is similar.

However, the indirect binary n-cube network does not pass $\rho_i^{-1}, \delta, \lambda, \mu_i$, or $\mu_i^{-1}$. Therefore, in accordance with an aspect of the present invention, the following permutation is introduced.

Definition. Define $\xi$ to be permutation, $\xi(x_{n-1:h}x_{h-1:0}) = x_{h-1:0}x_{n-1:h}$.

Having introduced the permutation $\xi$, it can be shown that the indirect binary n-cube network of FIG. 4 does pass the following composite permutations recited in Lemma 9.

Lemma 9. The indirect binary n-cube network passes the following permutations
 f) $\rho_i^{-1} o \xi$;
 g) $\delta o \xi$;
 h) $\lambda o \xi$;
 i) $\mu_i o \xi$ and $\mu_i^{-1} o \xi$.

Proof. To show that the network passes $\rho_i^{-1} o \xi$, let $y = \rho^{-1} o \xi(x) = \xi(\rho_i^{-1}(x))$. It follows that $y_k = x_k \oplus x_{k+h} \oplus i_k \oplus i_{k+h}$ for $0 \leq k < h$, and $y_k = x_k \oplus i_k$ for $h \leq k < n$. Thus, the functions defining $\rho_i^{-1} o \xi$ are in the form of (1).

To show the network passes $\delta o \xi$, let $y = \delta o \xi(x) = \xi(\delta(x))$. It follows that $y_k = x_k \oplus x_{k+h}$ for $0 \leq k < n$, and $y_k = x_k$ for $h \leq k < n$. Thus, the functions defining $\delta o \xi$ are in the form of (1).

To show the network passes $\lambda o \xi$, let $y = \lambda o \xi(x) = \xi(\lambda(x))$. It follows that $y_k = x_k \oplus x_{k+h}$ for $0 \leq k < h$, and $y_k = x_k$ for $h \leq k < n$. Thus, the functions defining $\lambda$ are the form of (1).

To show that the network passes $\mu_i o \xi$, let $y = \lambda_i o \xi(x) = \xi(\mu_i(x))$. It follows that $y_k = x_k \oplus i_{k+h}$ for $0 \leq k < h$, and $y_k = x_k \oplus i_k \oplus i_{k-h}$ for $h \leq k < n$. Thus, the functions defining $\mu_i$ are the form of (1).

The proof that the network passes $\mu_i^{-1} o \xi$ is similar.

Figure 5:
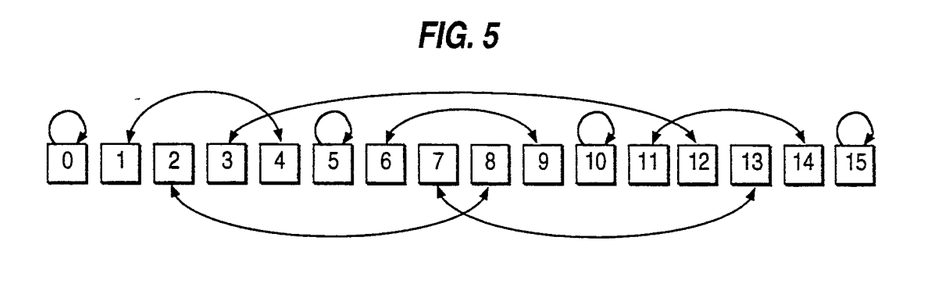
FIG. 5 illustrates a parallel version of a permutation $\xi$ for the case $N = 16$.

FIG. 5 illustrates the parallel version of the permutation $\xi$ for the case of N=16.

Now, let $\theta$ be any of the permutations $\rho_i^{-1}, \delta, \lambda, \mu_i$ or $\mu_i^{-1}$. Lemma 9 states that the indirect binary n-cube network is able to pass $\theta o \xi$. Furthermore, the $\xi$ interconnection can pass $\xi$, and $\theta = (\theta o \xi) o \xi$ due to $\xi^{-1} = \xi$. Therefore, according to an aspect of the present invention, an interconnection network 11 is provided with n+1 stages to meet the requirements for alignment of any of the N-vectors in U. Of this network, the first n stages form the indirect binary n-cube network, and the remaining one stage can be set to produce either the $\xi$ permutation or the identity permutation as desired. It is apparent that when the last stage of the network is set to produce the identity permutation, the network behaves the same as the indirect binary n-cube network. Hence, it can pass any of the permutations discussed in Lemma 8. When the last stage of the network is set to produce the $\xi$ permutation, however, the network can pass $\theta$ if the first n stages of the network are set to produce the $\theta o \xi$ permutation. This leads to the following result.

Theorem 3. Alignment of any N-vector in U can be performed by the suggested interconnection network with a single pass through the network.

In summary, according to the present invention, an efficient solution is provided to the problem of parallel, conflict-free access to rows, columns, diagonals, contiguous blocks, and distributed blocks of an N×N matrix in an array processor that uses the minimal hardware configuration with the same number of processing elements and memory modules. The solution is straightforward to implement, and the resultant array processor has the advantage of both simplicity and efficiency in two important aspects of the system. First, it uses the minimum number of memory modules to achieve memory conflict-free access, and the memory system is able to generate simultaneously all N local addresses for the elements of any N-vector of interest from 0(log N) logic gates in a constant number of gate delays. Second, the interconnection network is able to align any of the N-vectors under consideration with a single pass through the network.

An important class of numerical applications employs algorithms linking data that are conceived to be on some set of neighbours on a rectangular grid in two dimensions. Pease has shown that when the indirect binary n-cube network (FIG. 4) is used to interconnect the N processing elements 3, each processing element can be connected to any of its eight neighbours with a single pass through the network as if the network were the rectangular grid of N points of FIG. 6 with the kth processing element at row $k_{n-1:h}$ and column $k_{h-1:0}$ of the grid.

Figure 6:
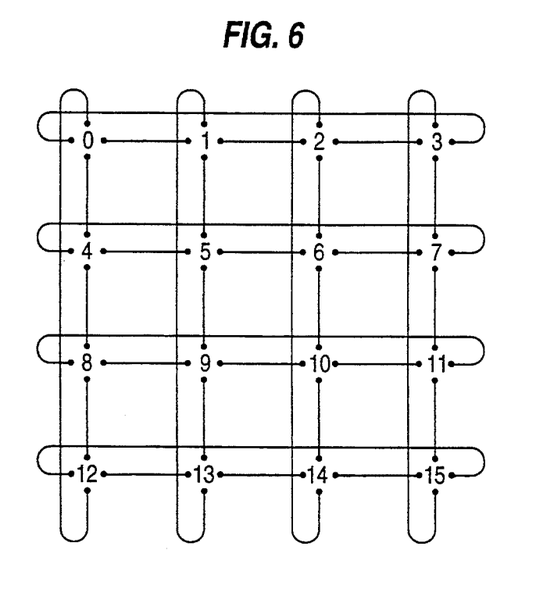
FIG. 6 illustrates a rectangular grid of $N = 16$ points for illustrating the manner of connecting processing elements in accordance with the present invention.

The same result can also be achieved by making use of the interconnection network of the present invention described above.

As discussed above, contiguous blocks and distributed blocks are two-dimensional data organization. Thus, given the capability of conflict-free access and alignment of contiguous blocks and distributed blocks, it is possible according to the interconnection network of the present invention for each processing element to obtain from its eight neighbours any data in a 3-by-3 window as well as any data in a $2\sqrt{N}$-by-$2\sqrt{N}$ window in matrix space with equal simplicity. This can be used as an highly parallel facility for image processing and numerical applications.

Other embodiments and modifications of the present invention are possible within the sphere and scope of the claims appended hereto.

I claim:

1. An array processor, comprising:

N processing elements;

N memory modules;

an interconnection network interconnecting said processing elements and said memory modules, for effecting parallel access and alignment of rows, columns, diagonals, contiguous blocks and distributed blocks of an N×N array denoted as A, where for an integer i, where $0 \leq i < N$, $i_m$ denotes bit m in a binary representation of said integer, and where $i_{j:m} i_{p:q}$ denotes a further integer derived by concatenating $i_{p:q}$ at rightward of $i_{j:m}$, by performing a nonlinear skewing scheme for mapping each element A [i,j] of an N-vector in $\Gamma_G{}^l \cup \Delta_G{}^l$ to a distinct one of said memory modules denoted as F(i,j), for avoiding memory conflicts, where $F(i,j) = \omega(i) \oplus j$ for $0 \leq i, j < N$, and $\omega(i_{n-1:h} i_{h-1:0}) = i_{h-1:0} (i_{n-1:h} \oplus i_{h-1:0})$, and where $h = n/2$; and O (log N) logic gates are provided for said N memory modules for:

a) accessing any N-vector in $\Gamma_G{}^l$ by addressing memory location $l \oplus Gk$ of memory module k for all $0 \leq k < N$, where G is any fixed integer and $\Gamma_G{}^l = \{A[\omega^{-1}(l \oplus Gk), l \oplus Gk] | 0 \leq k < N\}$, where $0 \leq G, l < N$ defines a partition of A into N-Vectors; and b) accessing any N-vector in $\Delta_G{}^l$ by addressing memory location $l \oplus G\omega(k)$ of memory module k for all $0 \leq k < N$, where $\Delta_G{}^l = \{A[\omega^{-1}(l \oplus G\omega(k) \oplus k), l \oplus G\omega(k)] | 0 \leq k < N\}$, for $0 \leq G, l < N$.

2. The array processor of claim 1, wherein an address bus structure for parallel generation of local addresses in said N memory modules for accessing any N-vectors defined by $\Gamma_G{}^l$ and $\Delta_G{}^l$, comprising 4n address lines $a_{n-1}, b_{n-1}, c_{n-1}, d_{n-1}, \ldots, a_o, b_o, c_o, d_o$, where $n = \log N$, wherein address lines $a_i, b_i, c_i$ and $d_i$ are driven by $l_i \oplus G_i, (l_i \oplus G_i), \bar{a} + l_i \alpha, (l_i \oplus G_i) \alpha + l_i \bar{\alpha}$, and $l_i$, respectively, for all $0 \leq i < n$, where + denotes a logical or operation and $\alpha$ is a binary control variable, each memory module being provided with n address pins wherein an ith address pin of said n address pins assumes the ith significant bit position of an n-bit address, said n address pins of each said memory module being connected to predetermined ones of said address lines as follows: for all $h \leq i < n$, address pins i and $i-h$ of memory module k are connected to address lines $d_i$ and $d_{i-h}$ if $k_i = 0$ and $k_{i-h} = 0$; to address lines $c_i$ and $a_{i-h}$ if $k_i = 0$ and $k_{i-h} = 1$; to address lines $b_i$ and $c_{i-h}$ if $k_i = 1$ and $k_{i-h} = 0$, to address lines $a_i$ and $b_{i-h}$ of $k_i = 1$ and $k_{i-h} = 1$.

3. The array processor of claim 1, wherein O (log N) logic gates being provided for said N memory modules for:

a) accessing any row, column or distributed block of A by addressing memory location $l \oplus Gk$ of memory module k for all $0 \leq k < N$, where $0 \leq G, l < N$ defines a partition of A into N-vectors; and b) accessing any forward diagonal, backward diagonal, or contiguous block of A by addressing memory location $l \oplus G\omega(k)$ of memory module k for all $0 \leq k < N$, where $0 \leq G, l < N$.

4. An array processor, comprising:

N processing elements;

N memory modules;

an interconnection network interconnecting said processing elements and said memory modules, for effecting parallel access and alignment of rows, columns, diagonals, contiguous blocks and distributed blocks of an N×N array denoted as A, where for an integer i, where $0 \leq i < N$, $i_n$ denotes bit m in a binary representation of said integer, and where $i_{j:m} i_{p:q}$ denotes a further integer derived by concatenating $i_{p:q}$ at rightward of $i_{j:m}$, by performing a nonlinear skewing scheme for mapping each element A [i,J] of an N-vector in $\Gamma_G{}^l \cup \Delta_G{}^l$ to a distinct one of said memory modules denoted as F(i,j), for avoiding memory conflicts, where $F(i,j) = \omega(k) \oplus j$ for $0 \leq i, j < N$, and $\omega(i_{n-1:h} i_{h-1:0}) = i_{h-1:0} (i_{n-1:h} \oplus i_{h-1:0})$, and where $h = n/2$; and said interconnection network comprising n+1 stages wherein a first n stages of said n+1 stages form an indirect binary n-cube network, and a remaining stage of said n+1 stages is adapted to produce one of either an identity permutation for passing the following permutations:
a) $\tau_i$ and $\tau_i^{-1}$
b) $\rho_i$;
c) $\delta^{-1}$;
d) $\lambda^{-1}$;
e) $\tau_i$ and $\tau_i^{-1}$;

or a permutation, where $\xi(x_{n-1:h}x_{h-1:0})=x_{n-1:0}x_{n-1:h}$ for passing the remaining permutations, as follows:
f) $\tau_i(x)=F(i,x)$;
g) $\rho_i(x)=F(x,i)$;
h) $\delta(x)=F(x,\underline{x})$;
i) $\lambda(x)=F(x,\overline{x})$;
j) $\tau_i(x)=F(i_{n-1:h}x_{n-1:h},i_{h-1:0}x_{h-1:0})$;
k) $\mu_i(x)=F(x_{n-1:h}i_{n-1:h},x_{h-1:0}i_{h-1:0})$.

5. An array processor, comprising:
N processing elements;
N memory modules;
an interconnection network interconnecting said processing elements and said memory modules, for effecting parallel access and alignment of rows, columns, diagonals, contiguous blocks and distributed blocks of an N×N array denoted as A, where for an integer i, where $0 \leq i < N$, $i_m$ denotes bit m in a binary representation of said integer, and where $i_{j:m} i_{p:q}$ denotes a further integer derived by concatenating $i_{p:q}$ at rightward of $i_{j:m}$, by performing a nonlinear skewing scheme for mapping each element A [i,j] of an N-vector in $\Gamma_G^l \cup \Delta_G^l$ to a distinct one of said memory modules denoted as F(i,j), said element A[i,j] is stored in one of either location j or i of said memory module F(i,j), for avoiding memory conflicts, where $F(i,j)=\omega(i) \oplus j$ for $0 \leq i, j < N$, and $\omega(i_{n-1:h} i_{h-1:0})=i_{h-1:0} (i_{n-1:h} \oplus i_{h-1:0})$, and where $h=n/2$; and O (log N) logic gates are provided for said N memory modules for:
a) accessing any N-vector in $\Gamma_G^l$ by addressing memory location $l \oplus Gk$ of memory module k for all $0 \leq k < N$, where G is any fixed integer and $\Gamma_G^l = \{A[\omega^{-1}(l \oplus Gk), l \oplus Gk] | 0 \leq k < N\}$, where $0 \leq G, l < N$ defines a partition of A into N-vectors; and b) accessing any N-vector in $\Delta_G^l$ by addressing memory location $l \oplus G\omega(k)$ of memory module k for all $0 \leq k < N$, where $\Delta_G^l = \{A[\omega^{-1}(l \oplus G\omega(k) \oplus k), l \oplus G\omega(k)] | 0 \leq k < N\}$, for $0 \leq G, l < N$.

6. The array processor of claim 5, wherein an address bus structure for parallel generation of local addresses in said N memory modules for accessing any N-vectors defined by $\Gamma_G^l$ and $\Delta_G^l$, comprising 4n address lines $a_{n-1}, b_{n-1}, c_{n-1}, d_{n-1}, \ldots, a_o, b_o, c_o, d_o$, where $n = \log N$, wherein address lines $a_i, b_i, c_i$ and $d_i$ are driven by $l_i \oplus G_i$, $(l_i \oplus G_i)a + l_i\alpha$, $(l_i \oplus G_i)\alpha + l_i\alpha$, and $l_i$, respectively, for all $0 \leq i < n$, where + denotes a logical or operation and $\alpha$ is a binary control variable, each memory module being provided with n address pins wherein an ith address pin of said n address pins assumes the ith significant bit position of an n-bit address, said n address pins of each said memory module being connected to predetermined ones of said address lines as follows: for all $h \leq i < n$, address pins i and i−h of memory module k are connected to address lines $d_i$ and $d_{i-h}$ if $k_i = 0$ and $k_{i-h} = 0$; to address lines $c_i$ and $a_{i-h}$ if $k_i = 0$ and $k_{i-h} = 1$; to address lines $b_i$ and $c_{i-h}$ if $k_i = 1$ and $k_{i-h} = 0$, to address lines $a_i$ and $b_{i-h}$ of $k_i = 1$ and $k_{i-h} = 1$.

7. The array processor of claim 5, wherein the O (log N) logic gates are provided for:
a) accessing any row, column or distributed block of A by addressing memory location $l \oplus Gk$ of memory module k for all $0 \leq k < N$, where $0 \leq G, l < N$ defines a partition of A into N-vectors; and b) accessing any forward diagonal, backward diagonal, or contiguous block of A by addressing memory location $l \oplus G\omega(k)$ of memory module k for all $0 \leq k < N$, where $0 \leq G, l < N$.

* * * * *

UNITED STATES PATENT AND TRADEMARK OFFICE
CERTIFICATE OF CORRECTION

PATENT NO. : 5,394,553
DATED : February 28, 1995
INVENTOR(S) : Lee

It is certified that error appears in the above-indentified patent and that said Letters Patent is hereby corrected as shown below:

Title Page, under "Other Publications" delete all publications listed on title page.

Page 2, continuation of "Other Publications", delete the first five publications listed.

Page 2, continuation of "Other Publications", second column, line 31, "conflects" should be --conflicts--.

Column 1, line 67, after "N." insert --If--.

Column 3, line 18, delete "]".

Column 3, line 67, delete "an".

Column 4, line 2, "9" should be --]--.

Column 4, line 23, "[" (second occurrence) should be --]--.

Column 4, line 32, "blow" should be --below--.

Column 4, line 67, "$F(i_{n-1},$" should be --$F(i_{n-1},$--.

*Column 5, line 16, "A[i.v]" should be --A[i,v]--.

Column 6, line 1, "$\omega$" should be --$\omega^{-1}$--.

Column 6, after line 6, insert the following line:
--b) $\Gamma_G^i \cap \Gamma_G^j = \emptyset$ for any $i \neq j$;--

UNITED STATES PATENT AND TRADEMARK OFFICE
CERTIFICATE OF CORRECTION

PATENT NO. : 5,394,553
DATED : February 28, 1995
INVENTOR(S) : Lee

It is certified that error appears in the above-indentified patent and that said Letters Patent is hereby corrected as shown below:

Column 6, line 15, "V-vectors" should be --N-vectors--.
Column 6, line 40, "$\{A[\omega^{-1}(1\oplus G\omega(k)\omega k),$" should be
    --$\{A[\omega^{-1}(1\oplus G\omega(k)\oplus k),$
Column 6, line 45, "," should be --;--.
Column 6, after line 45, insert the following line:
    --$\Delta_G^i \cap \Delta_G^j = \emptyset$ for any $i \neq j$;--
Column 7, line 20, "OR" should be --or--.
Column 8, line 6, "$k_{i+}$" should be --$k_{ith}$--.
Column 8, line 9, "gages" should be --gates--.
Column 8, line 60, "$\rho$" should be --$\varrho$--.
Column 8, line 63, "Y" should be --$\tau$--.
Column 9, line 59, "$y_k = x_k \oplus i_{k-1}$" should be
    --$y_k = x_k \oplus i_{k-h}$--.
Column 10, line 10, "$y_k + x_k \oplus i_{k-h}$" should be
    --$y_k = x_k \oplus i_{k-h}$--.
Column 10, line 38, "$0 \leq k < n$" should be --$0 \leq k < h$--.
Column 12, line 55, "$i_n$" should be --$i_m$--.
Column 12, line 60, "[,J]" should be --[i,j]--.

UNITED STATES PATENT AND TRADEMARK OFFICE
CERTIFICATE OF CORRECTION

PATENT NO. : 5,394,553
DATED : February 28, 1995
INVENTOR(S) : Lee

Page 3 of 3

It is certified that error appears in the above-indentified patent and that said Letters Patent is hereby corrected as shown below:

Column 12, line 62, "$=\omega(k)\oplus j$" should be $--=\omega(i)\oplus j--$.

Column 14, line 1, "23" should be $--\leq--$.

Column 14, line 14, "$\alpha$" (first occurrence) and "$\alpha$" (fourth occurrence) should be $--\bar{\alpha}--$.

Signed and Sealed this

Twenty-first Day of November, 1995

Attest:

BRUCE LEHMAN

*Attesting Officer*         *Commissioner of Patents and Trademarks*

UNITED STATES PATENT AND TRADEMARK OFFICE
CERTIFICATE OF CORRECTION

PATENT NO. : 5,394,553
DATED : February 28, 1995
INVENTOR(S) : Lee

It is certified that error appears in the above-indentified patent and that said Letters Patent is hereby corrected as shown below:

Col. 12, line 7, "O" should be --0--.

Col. 12, line 8, "1⊕Gk" (first occurrence) should be --1⊕ $\overline{Gk}$--.

Col. 12, line 34, "of" should be --if--.

Col. 12, line 41, "O" should be --0--.

Col. 13, line 8, "$x_{n-1:0}$" should be --$x_{h-1:0}$--.

Col. 13, line 40, "O" should be --0--.

Col. 14, line 1, "1⊕Gk" should be --1⊕ $\overline{Gk}$--. (1st occurr.).

Col. 14, line 27, "of" should be --if--.

Col. 14, line 34, "O" should be --0--.

Columns 12, 13 & 14, lines 7, 40 & 34, " $\leqq$ " should be -- $\leq$ --.

Signed and Sealed this

Thirteenth Day of January, 1998

Attest:

*Attesting Officer*

BRUCE LEHMAN

*Commissioner of Patents and Trademarks*